Patented May 30, 1939

2,160,700

UNITED STATES PATENT OFFICE

2,160,700

CRYSTALLINE ANHYDROUS MONOCALCIUM PHOSPHATE

William H. Knox, Jr., Nashville, Tenn., assignor to Victor Chemical Works, a corporation of Illinois No Drawing. Application August 22, 1938, Serial No. 226,180

11 Claims. (Cl. 23—109)

This invention relates to crystalline anhydrous monocalcium phosphate and a method for preparing the same, and more particularly to such material in the form of non-porous, minute crystals.

Hydrated monocalcium phosphate has heretofore been referred to in connection with baking materials and has been extensively used. It is subject to the difficulty, however, that its rate of reaction with sodium bicarbonate in dough mixtures is too rapid for the most efficient utilization of its theoretical leavening power.

In accordance with this invention, a solid unground, non-porous crystal anhydrous monocalcium phosphate is produced, which is markedly better as a baking acid than hydrated monocalcium phosphate, and which is acid-free, but contains all of the impurities of the reacting ingredients, which are lime and phosphoric acid.

The production of anhydrous monocalcium phosphate has heretofore been suggested by Bassett in an article referred to by Mellor, Inorganic and Theoretical Chemistry, vol. 3, 1923, page 887, but the Bassett product was produced by fractional crystallization from an acid solution and the process there described, if carried out, would produce a material having a neutralization value of above 95 and large crystals which are relatively needle-like in shape. That product has distinctly less stability on standing in the presence of moisture than the present product, does not contain the impurities of the reacting materials, and is distinctly less satisfactory for heat treatment to increase the effectiveness of the material as a baking acid, as described in Schlaeger application, Serial No. 226,174, filed August 22, 1938.

The product of the present invention is prepared by reacting phosphoric acid of high strength with lime. The conditions under which the reaction is carried out should be very carefully controlled to prevent the formation of any hydrated monocalcium phosphate, inasmuch as once the reaction has started toward the hydrated material, it tends to continue in that direction. In this connection, the reaction temperature should at all times be in excess of 140° centigrade, and, to avoid the formation of any hydrated monocalcium phosphate, the temperature should be controlled and produced by the heat of reaction of the materials. The phosphoric acid used is preferably heated in advance and its concentration is made great enough that the reaction will generate sufficient heat to elevate the temperature of the materials as well as the water in the phosphoric acid solution to the requisite temperature.

Under normal conditions this requires a phosphoric acid having a Baumé gravity strength in excess of 54°. With phosphoric acids near this border line, it is preferable to use only quicklime as the other reagent, but with acids of higher strength the lime may be partially or entirely hydrated. In any event, the amount of water present either with the phosphoric acid or with the lime is made low enough not to reduce the reaction temperature below 140° centigrade. It is preferred not to use an acid having Baumé gravity strength above 65° because of the mechanical difficulties in securing rapid and intimate mixing in the reaction in such case.

It is preferred that in preparing the anhydrous monocalcium phosphate the total water present at the beginning of the reaction including that produced by the reaction be not less than 15% and not more than 32% based on the total CaO and $H_3PO_4$ and that the elimination of this water from the reaction mass be accomplished under such conditions that a dry product results without any substantial formation of a hydrated monocalcium phosphate.

In the preferred process, the temperature of the reaction is carried considerably above 140° C., best results having been obtained in the range from 160° C. to 170° C. or sometimes 175° C. Where the upper limit is employed, greater care must be exercised to avoid the formation of pyrophosphate. The presence of any considerable amount of pyrophosphate distinctly lessens the value of the product, both by lessening its stability and by affecting its ability to be heat treated under the Schlaeger process. The process should, therefore, not be operated above 175° C. for any extended period of time.

When the process is operated at a reaction temperature of 160° C. to 170° C., it is preferred to correlate the strength of the acid, the degree of hydration of the lime, and the original temperature of the reacting ingredients, so that they are capable of raising the temperature above 170° C. Then by rapid mixture of lime and acid, the temperature is brought quickly to at least 160° C. and is maintained within that range during subsequent additions of lime by the use of a volatile liquid such as water as a cooling agent. This is accomplished by spraying small quantities of water from time to time directly into the reacting mass, the latent heat of the water and the dispersion of it serving to prevent any local overheating which would not be prevented by indirect cooling. Particularly where water is the material sprayed, it is preferable not to add it after the last addition of lime.

The amount of lime employed should be such as to produce a neutralizing value in the final product below 95 and generally above 80, the amount preferably being such as to have a neutralizing value in the range of 84 to 93, and preferably 87 to 91, the product in this range having greatest stability, other conditions being equal, against rehydration.

It is also preferred that the reaction in the higher temperature range be carried out as rapidly as possible, inasmuch as the formation of pyrophosphate, or the tendency to form pyrophosphate, is greatly increased by the increase of the time of reaction. When proceeding in the manner above set forth, by which the reaction temperature is rapidly raised to 160° C., the reaction may be completed in 20 to 25 minutes. It is preferred that it should be less than 30 minutes. Naturally, longer times are necessary in the lower ranges of the temperature and at 140° C., the time of reaction is considerably longer.

The acid employed may be any reasonably pure acid, but it is preferred that the acid be blast furnace acid, or have the impurities characteristic of such blast furnace acid. The inclusion of these impurities in the product increases its stability against hydration, and is valuable in fitting it for heat treatment in accordance with the Schlaeger process.

A typical example involving the preferred batch procedure is as follows:

A quantity of 57.5° Baumé gravity strength phosphoric acid was heated to approximately 110° C., placed in a batch mixer equipped with an efficient agitator, and quicklime equivalent to about 70% to 80% of that theoretically required to produce monocalcium phosphate was added as rapidly as possible without permitting the reaction temperature to rise above 170° C., the lime added having been previously ground to at least 100 mesh or below, this state of division being preferred in order to increase rapidity of the reaction, as well as uniformity thereof. As the temperature began to drop below 165° C. due to the evolution of steam, small additions of hydrated lime were made causing the temperature again to rise. As the temperature approached 170° C., water in small amounts was sprayed into the mixture, but the temperature was not permitted to fall below 160° C. Preferably it is maintained above 165° C. The reaction temperature was thus maintained until sufficient hydrated lime had been added to obtain a product which was definitely neutral to methyl orange. Approximately 2.5% excess lime over that theoretically required was used in the batch. Under the conditions outlined, the batch temperature was maintained between 170° C. and 160° C. for 25 minutes.

The suitability of the resulting product for heat treatment was tested by heating over a period of 2½ hours from a temperature of about 30 to 60° C., to a temperature of 210° C. to 220° C., after which the reaction rates thereof were determined. The reaction rates are determined by measuring the amount of $CO_2$ evolved at 27° C. in a standard baking powder or dough mix containing sufficient sodium bicarbonate theoretically to liberate 200 cc. of $CO_2$. When the baking powder mix is used in a water medium the evolution of $CO_2$ in the first two minutes is compared with that liberated in the next eight minutes. In some cases a dough mix is used and in such cases the first two minutes are compared with the next thirteen. In either case the amount of $CO_2$ evolved in the first two minutes may be termed the primary reaction rate, and for the next period the secondary reaction rate. Unless specifically stated to be otherwise, the rates given in the example are with an aqueous medium. With ordinary baking powders, the greatest generation of gas occurs in the first two minutes, after which it is relatively small. For example, in an ordinary powdered hydrated monocalcium phosphate baking powder, 60% of the total $CO_2$ is evolved in the first two minutes by the dough method, whereas only an additional 4 to 6% of the total is generated in the next thirteen minutes. As compared to this, a typical sample of the present product will generate only 45% of the total $CO_2$ in the first two minutes, as compared to an additional 15 to 20% in the next thirteen minutes. The same product, after heat treatment, showed a secondary rate of 45%, and this rate only dropped to 35% after storage of the heat treated product for 21 days in a humidor at a temperature of 39° C. in an atmosphere of 65% relative humidity.

In another example, where the batch temperature was maintained between 150° C. and 160° C. for 25 minutes, the product after further heat treatment had a secondary rate of 119 cc., which, after 21 days under the same humidor conditions, had decreased to 72 cc.

As stated before, it is preferred to add a slight excess of lime. The neutralizing value of pure anhydrous monocalcium phosphate is 95.7, this term meaning the parts by weight of sodium bicarbonate, which will be utilized by 100 parts by weight of the acid phosphate according to the following type reaction:

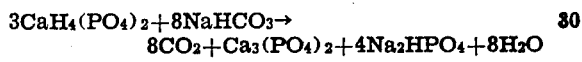
$$3CaH_4(PO_4)_2 + 8NaHCO_3 \rightarrow$$
$$8CO_2 + Ca_3(PO_4)_2 + 4Na_2HPO_4 + 8H_2O$$

The excess of lime here added eliminates any free acid from the product, thus materially reducing the hygroscopic nature thereof, and making it more suitable for employment in commercial type baking preparations, as well as increasing its stability. The excess lime appears in the product largely in the form of dicalcium phosphate, which appears to be concentrated in spots on the surfaces of the crystals. The product normally will not contain over 10% of dicalcium phosphate, however.

The method used for testing neutralizing values is that published by the American Association of Cereal Chemists as method 5b on page 117 of Cereal Laboratory Methods, 3rd edition, 1935.

In case no excess lime is used the small amount of excess acid present may be neutralized by the use of small amounts, say, from 0.5% to 3.0% of precipitated calcium carbonate, which not only serves as an agent for the neutralization of the free acid, but as a conditioner for the crystals of anhydrous monocalcium phosphate.

The product of the present invention, even without heat treatment in accordance with the Schlaeger process, has a primary reaction rate with sodium bicarbonate which is about 15% to 25% or more slower than the ordinary monohydrated monocalcium phosphate, and a secondary reaction rate which is 15% to 25% or more faster.

For example, one unheat-treated product prepared in accordance with the preferred process had a primary rate of 33½% and a secondary rate of 32½%, as compared with 63% and 3½%, respectively, in hydrated monocalcium phosphate. After 2 days at 35° C. and 60% humidity the respective rates had changed to 51 and 12½% for the unheat-treated product.

The special solid non-porous crystalline product herein described is slightly hygroscopic and may be greatly improved for commercial baking powders by the inclusion of a moisture absorbing filler such as starch. The starch used should have a low moisture content, preferably under 7%. The efficiency of the starch filler is due to its capacity to stick to and coat the anhydrous phosphate and preferentially absorb moisture, thus preventing rehydration of the anhydrous crystals of phosphate. The starch may be used in amounts up to 50% of the mixture, depending on the neutralizing value it is desired to maintain.

The crystals formed by the method of the present invention will substantially all pass through a 100 mesh screen, and most of them will pass through a 200 mesh screen. This is of great importance, inasmuch as baking powder acids are preferably of this fineness of division, while the grinding of the product of the present process materially decreases its value either in the form in which it is produced or after heat treatment.

The term "non-porous" as used in this specification and in the claims is intended to mean a solid particle not built up from an agglomeration of minute crystals with intervening fissures and spaces between the component parts of the whole particle nor a particle resulting from the driving out of water by heat from a crystal which contained water of crystallization.

The stability of the product under storage, particularly after heat treatment, in a moist atmosphere is considerably affected by the presence of impurities. Pure material does not retain its activity well in a damp place. The precise interrelation of the impurities, however, has not been determined. Impurities which are characteristic of blast furnace phosphoric acid and ordinary high grade lime appear to produce substantially the best results.

The protective coating or medium formed in heat treatment appears to include an insoluble alkali metal metaphosphate, possibly in combination with a calcium compound. Analysis of the residue of heat treated material remaining after completion of solution of the soluble material in water showed conversion of very considerable amounts of alkali metal from soluble to insoluble form during heat treatment.

For example, a product crystallized from a strong pure phosphoric acid solution, after heat treatment, completely hydrated in less than 48 hours at 39° C. in an atmosphere of 65% relative humidity. On the other hand, a heat treated product made with blast furnace acid containing its normal impurities showed an original secondary reaction rate of 123 cc. and even after 10 days' storage in a humidor at 39° C. and 65% relative humidity, still showed a secondary rate of 100 cc. At the end of 21 days under the said conditions the secondary rate was still 93 cc. This product showed the following impurities:

| | Per cent |
|---|---|
| Acid insoluble | 0.09 |
| $AlPO_4$ | 0.26 |
| $FePO_4$ | 0.15 |
| MgO | 0.19 |
| $SO_3$ | 0.21 |
| $K_2O$ | 0.38 |
| $Na_2O$ | 0.17 |

The addition of impurities to pure phosphoric acid sufficient to give this final composition in the anhydrous monocalcium phosphate will make it as suitable as the blast furnace acid itself.

Of the impurities noted, not all seem to be requisite in producing the improved result, the alkali metals being the most effective.

The function of the impurities is not chemically understood, but it appears that during the batch crystallization the impurities concentrate on the surface of the minute crystals and then, on heat treatment, are converted to insoluble phosphates, possibly fused or partially fused, which form a skin coating over the monocalcium phosphate. It is possible that the alkali metals serve merely as fluxing agents which lower the melting point of this coating. However, investigation has indicated that the percentage of insoluble iron and aluminum compounds does not alter substantially upon heat treatment, whereas the amount of insoluble potassium and sodium compounds increases enormously. For example, in one instance, an untreated sample showed only 0.01% $K_2O$ insoluble, but after heat treatment showed 0.17%. In the same sample the $Na_2O$ insoluble before heat treatment was 0.017%, which increased to 0.078% on heat treatment.

To illustrate the general effect of impurities on the stability of the unheat-treated product, an anhydrous monocalcium phosphate prepared with blast furnace acid and having a neutralizing value of 91.6 took up moisture at 39° C. in an atmosphere of 65% relative humidity to the extent of 1.30% in 1 day, 2.20% in 2 days and 4.32% in 8 days. As compared to this a pure crystallized anhydrous monocalcium phosphate having a neutralizing value of 95.0 took up 7.84% of moisture in 1 day. Another unheat-treated product having a neutralizing value of about 87.0 absorbed moisture only to the extent of 0.2% in 48 hours under the same humidity conditions.

At the same time there are indications that a small amount of the calcium is converted to insoluble phosphate.

The following tables indicate the effect of the addition of various impurities. Table I shows five batches of anhydrous monocalcium phosphate, the first batch being made from substantially pure acid and the remainder made from pure acid to which the indicated impurities had been added. It will be noted that MgO appears in all cases due to its presence in the lime employed:

*Table I*

| Batch | | Analyses (per cent) | | | | | |
|---|---|---|---|---|---|---|---|
| | | $K_2O$ | $Na_2O$ | $FePO_4$ | $AlPO_4$ | MgO | $SO_3$ |
| 1 | Pure acid | 0.04 | 0.08 | 0.07 | 0.08 | 0.17 | 0.04 |
| 2 | $K_2O$ added | 0.18 | 0.08 | 0.08 | 0.10 | 0.19 | 0.05 |
| 3 | Fe and Al added | 0.04 | 0.10 | 0.19 | 0.26 | 0.15 | 0.05 |
| 4 | $K_2O$, Fe and Al added | 0.19 | 0.08 | 0.18 | 0.26 | 0.15 | 0.05 |
| 5 | $K_2O$, Fe, Al, and $SO_3$ | 0.18 | 0.15 | 0.19 | 0.26 | 0.17 | 0.24 |

Table II shows the original secondary reaction rate of each batch after heat treatment and the secondary reaction rate after 1, 3 and 10 days' storage at 39° C. and 65% humidity.

*Table II*

| Batch | Initial | After 1 day | After 3 days | After 10 days |
|---|---|---|---|---|
| | cc. | cc. | cc. | cc. |
| 1 | 102 | 76 | 66 | 56 |
| 2 | 121 | 111 | 100 | 88 |
| 3 | 123 | 104 | 88 | |
| 4 | 124 | 112 | 97 | 87 |
| 5 | 123 | 114 | 104 | 91 |

In other examples commercially pure phosphoric acid was employed, to which only sodium and potassium were added in accordance with the following table:

Table III

| Per cent K₂O in product | Primary rate | Original Secondary rate | Secondary rate after 3 days in humidor |
|---|---|---|---|
|  | cc. | cc. | cc. |
| 0.2 | 28 | 107 | 81 |
| 0.4 | 16 | 118 | 115 |
| 0.9 | 12 | 118 | 14 |
| Per cent Na₂O |  |  |  |
| 0.12 | 28 | 110 | 110 |
| 0.18 | 18 | 117 | 66 |

The product was stored for three days in a humidor at 39° C. and 65% relative humidity.

The product containing 0.9% of K₂O was, however, not as stable as those containing smaller amounts. It is preferred to employ only 0.1 to 0.5% of alkali metal impurities, although amounts up to 1% are quite practicable. For example, anhydrous monocalcium phosphate was prepared with blast furnace acid to which 0.75% K₂O had been added. 2,000 lbs. of the above acid at 57° Baumé gravity strength was heated to 110° C. and 350 lbs. of finely ground quick-lime quickly added to the batch mixture. The temperature of the mixture rose quickly to 160° C., and further additions of lime were made at such rate that the temperature remained within the range of 160° C. to 173° C. until the mixture was definitely neutral to methyl orange indicator. The product was then heat-treated at a temperature of 190° C. to 230° C. The product showed a pyrophosphate content of between 3% and 4% and a secondary reaction rate of 120 to 129 cc. After four days' storage in a humidor at 39° C. 65% relative humidity, the secondary reaction rate was 93 cc. and after nine days was 74 cc.

A typical lime employed had the following composition:

Table IV

|  | Per cent |
|---|---|
| CaO | 98 |
| MgO | .3 |
| Insoluble—mostly silica | .45 |
| Fe₂O₃ and Al₂O₃ | .2 |
| SO₃ | .03 |
| Loss on ignition | 0.9 |
| K₂O | 0.007 |
| Na₂O | 0.028 |

(balance undetermined)

Blast furnace acid as here discussed is acid which has been produced in the customary manner, the production including the removal of undesirable or toxic impurities such as lead, arsenic and fluorine. A typical approximate composition for 56° Baumé acid is as follows:

Table V

|  | Per cent |
|---|---|
| P₂O₅ | 56.6 |
| H₃PO₄ | 76.8 |
| FePO₄ | 0.1–0.2 |
| AlPO₄ | 0.2–0.3 |
| CaO | .02–.03 |
| MgO | .02–.03 |
| Na₂O | 0.1–0.2 |
| K₂O | 0.20 to 0.40 |
| SiO₂ | .01 |
| SO₃ | 0.2–0.3 |
| Mn, As, F, Ni, etc. | less than 0.05 |

For the preferred product it is desirable that the product should contain at least 0.1% of an alkali metal, particularly potassium. It should not contain more than 5% of material classified as "pyrophosphate" and should have less than 3% of such material. It should produce on heat treatment a product having the property of reacting with sodium bicarbonate in water solution or wet dough mixtures at such rate that less than 25% of the reaction is completed in the first two minutes (primary reaction rate), while at least 35% of the total gas evolution takes place within the succeeding two to ten or two to fifteen minute period (secondary reaction rate). The stability of the product should be such that after 20 days' storage at 39° C. in an atmosphere of 65% relative humidity, the secondary reaction rate is still at least 60 cc., or 30% of the total theoretical gas.

The new product is particularly valuable in baking powders or self-rising flours. It is applicable to cake and waffle ready-made flour mixtures, and permits the use of higher ratios of sugars and flavoring ingredients therein. Normally, the ready-mixed cake and waffle materials on the market contain sodium acid pyrophosphate because of its slow reaction rate, but the baked products are not entirely satisfactory because the residual pyrophosphate salts leave a characteristic, slightly bitter, astringent taste in the baked product which is known as "pyro flavor".

When sodium acid pyrophosphate is used at its correct neutralizing value the pyrophosphate and its residual salts give the baked product an alkalinity of the order of a pH value of 7.8 This degree of alkalinity has a detrimental effect on the flavoring ingredients. On the other hand, if the sodium acid pyrophosphate is used at such neutralizing value as to insure a lower pH value of around 7.0 the intensity of the "pyro flavor" is increased. When substituting the present product for the sodium acid pyrophosphate in prepared cake and waffle flours, it can be used at its correct neutralizing value giving a baking product with a pH value of the order of 7.0 to 7.1 without any "pyro flavor". The lower alkalinity will permit a better development and retention of the desirable flavors without the use of excess amounts of flavoring ingredients to offset a "pyro flavor". The prepared self-rising flour mixes may include the proper amounts of sugar, shortening, salt and other flavoring agents to give the desired type of baking product.

Where pyrophosphate contents are given they were determined by dissolving a sample of the product in dilute hydrochloric acid, neutralizing with N/10 caustic soda to a brom-phenol blue end-point, then adding an excess of zinc sulfate to precipitate the pyrophosphate as a zinc salt and titrating the liberated sulfuric acid with N/10 NaOH to a brom-phenol blue end-point and calculating the result as calcium acid pyrophosphate.

The terms 100 mesh and 200 mesh sizes are used in this specification and claims to mean particles which have been passed through standard 100 mesh and 200 mesh sieves having openings of 0.0058″ and 0.0029″, respectively.

This application is a continuation-in-part of my copending application, Serial No. 147,783, filed June 11, 1937.

The foregoing detailed description has been given for clearness of understanding only, and no unnecessary limitations should be under-

I claim:

1. The process of making anhydrous monocalcium phosphate, which comprises mixing orthophosphoric acid and lime, the strength of the acid, the degree of hydration of the lime, and the temperature of the material being correlated to spontaneously produce a reaction temperature in excess of 140° centigrade, and the amount of lime being more than theoretically required to produce monocalcium phosphate, and controlling the reacting conditions to maintain at all times during reaction a temperature in excess of 140° C. but below a temperature at which any substantial amounts of pyrophosphate will form and continuing the reaction until a substantially dry mass of minute crystals of solid, non-porous anhydrous monocalcium phosphate is produced, without forming at any time during the process any substantial amount of hydrated monocalcium phosphate.

2. The method as set forth in claim 1, in which the acid has a Baumé gravity strength of more than 54° and not over 65°.

3. The method as set forth in claim 1, in which the reaction temperature is maintained substantially in the range from 160° C. to 170° C. until the reaction is complete.

4. The method of making anhydrous monocalcium phosphate, which comprises reacting orthophosphoric acid having a Baumé gravity strength in excess of 54° with lime in proportions to produce monocalcium phosphate, the strength of the acid, the degree of hydration of the lime, and the temperature of the materials being correlated to be capable of producing a reaction temperature in excess of 170° C., the acid and some of the lime being mixed rapidly to produce a temperature in excess of 160° C. and below 175° C., additional lime being added from time to time sufficient to produce a temperature in excess of 170° C., but water being added to the reaction mass to maintain its temperature over 160° C. and below 175° C., and the reaction being continued in this temperature range to produce a mass of solid non-porous minute crystals of anhydrous mono-calcium phosphate.

5. Anhydrous monocalcium phosphate in the form of minute non-porous crystals substantially stable against hydration, containing excess lime sufficient to produce a neutralization value less than 95 and above 80, and containing 0.10% to 1% of alkali metal calculated as oxide.

6. The product as set forth in claim 5, in which the material contains from 0.10% to 0.50% of alkali metal calculated as oxide.

7. The product as set forth in claim 5, in which a substantial portion of the alkali metal is potassium.

8. As an article of manufacture, solid, non-porous, anhydrous, monocalcium phosphate crystals, the crystals being substantially small enough to pass a 100 mesh screen and having a concentration of alkali metal impurities at their surfaces, having a primary reaction rate with sodium bicarbonate not substantially greater than 45%, a secondary rate of at least approximately 15%, and a stability against rehydration such that after 48 hours' exposure to an atmosphere of 65% relative humidity at 39° C. the anhydrous monocalcium phosphate has not completely rehydrated.

9. An article of manufacture as set forth in claim 8, in which the monocalcium phosphate crystals contain excess lime sufficient to reduce the neutralization value thereof below 95 but not below 80.

10. A composition consisting essentially of solid, non-porous, anhydrous, monocalcium phosphate crystals containing excess lime sufficient to reduce the value thereof to the range of approximately 84 to 93, the product having a primary reaction rate with sodium bicarbonate not substantially greater than 45%, a secondary rate of at least approximately 15%, and a stability against rehydration such that after 48 hours' exposure to an atmosphere of 65% relative humidity at 39° C. the anhydrous monocalcium phosphate has not completely rehydrated.

11. Anhydrous monocalcium phosphate in the form of minute, non-porous crystals, the crystals containing the impurities characteristic of blast furnace acid and containing excess lime sufficient to reduce the neutralizing value to below 95 but above 80.

WILLIAM H. KNOX, Jr.